US007412686B2

(12) United States Patent
Guthrie et al.

(10) Patent No.: US 7,412,686 B2
(45) Date of Patent: Aug. 12, 2008

(54) INTEGRATED DEVELOPMENT ENVIRONMENT ACCESS TO REMOTELY LOCATED COMPONENTS

(75) Inventors: Scott D. Guthrie, Bellevue, WA (US); Nikhil Kothari, Sammamish, WA (US); Susan M. Warren, Carnation, WA (US); Andrew C. Lin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 10/361,359

(22) Filed: Feb. 10, 2003
(Under 37 CFR 1.47)

(65) Prior Publication Data

US 2004/0158811 A1    Aug. 12, 2004

(51) Int. Cl.
*G06F 9/44* (2006.01)
(52) U.S. Cl. .................. 717/102; 717/103; 717/176; 717/178
(58) Field of Classification Search .......... 717/100, 717/120, 178, 102, 103, 176; 707/103; 714/38; 709/227
See application file for complete search history.

(56) References Cited

U.S. PATENT DOCUMENTS

| 5,778,368 A * | 7/1998 | Hogan et al. ............... 707/10 |
| 5,963,955 A * | 10/1999 | Melahn et al. ........... 707/103 R |
| 2004/0003091 A1 * | 1/2004 | Coulthard et al. ........... 709/227 |
| 2004/0054945 A1 * | 3/2004 | Smith .......................... 714/38 |

OTHER PUBLICATIONS

Sun Microsystems Inc., "Forte for Java, Enterprise Edition Getting Started Guide", Aug. 2001, 40 pages.*
Sun Microsystems Inc. "Forte for Java, Assembling and Executing J2EE Modules and Applications", Aug. 2001, 100 pages.*
"Forte for Java (Community Edition) User's Guide", 2000, Chapter 11, Section "Modules in Forte for Java" (21 pages extracted). Online retrieved at <http://www.camden.rutgers.edu/HELP/Documentation/Sun-compiler-docs/forte4j>.*
Jewell, Dave, "JBuilder—Late But Great", EXE, vol. 12, No. 4, Centaur Communications, UK, p. 18-19, 21, 23-24, 26, 28, 30, Sep. 1997.
Lefer, Wilfrid, "Automatic Graphic User Interface Generation for VTK", Journal of WSCG, vol. 10, No. 1, Univ. West Bohemia, Czech Republic, p. 279-85, 2002.

* cited by examiner

*Primary Examiner*—Tuan Q. Dam
*Assistant Examiner*—Thuy Dao
(74) *Attorney, Agent, or Firm*—Workman Nydegger (57) ABSTRACT

Access to remotely located components for developing programs is provided with an interface that is launched from directly within an Integrated Development Environment (IDE). The interface is configured to access one or more desired component repositories through a web service. A programmer can use the interface to query the component repositories for one or more desired components. The interface can also provide additional information that is known about the identified components, as obtained from the web service hosting the component repositories. Once the one or more desired components are identified, the interface can also be used to download and install the components directly into the component toolboxes of the IDE for immediate use. The components may include various files that are contained in a modified dynamic loadable library (DLL) file format or another format that allows the files to be authenticated.

21 Claims, 5 Drawing Sheets

INTEGRATED DEVELOPMENT ENVIRONMENT ACCESS TO REMOTELY LOCATED COMPONENTS

BACKGROUND OF THE INVENTION

1. The Field of the Invention

The present invention relates to the general field of computing systems and, more particularly, to the development of integrated development environments utilized by computing systems and, even more particularly, to accessing components for use by the integrated development environments.

2. Background and Relevant Art

There are many different types of systems and environments that can be used by a computer programmer to develop code and create computer programs. These systems and environments are collectively referred to herein as Integrated Development Environments (IDEs). IDEs typically include graphical interfaces comprising toolboxes of components for developing code. Non-limiting examples of programming components include controls, IDE extensions and plugins.

A RAD (Rapid Application Development) system, for example, provides visual tools that can be selected by a programmer to build programs very quickly, without having to author every line of code. Non-limiting examples of RAD systems include Visual Basic, Delphi, Eclipse, Dreamweaver and Netbeans. RAD systems historically emphasized the programming speed at which code could be developed at the expense of generating efficient code. However, they can now be used to produce code quickly and without compromising the efficiency of the code.

Other traditional programming environments have also made improvements that enable them to utilize many of the visual tools and graphical interfaces that were previously available only in a RAD system. Accordingly, the line between RAD systems and non-RAD systems is somewhat blurred. Accordingly, embodiments within the scope of the present application extend broadly to any IDE that can be utilized to develop code with the use of IDE type components.

As mentioned above, an IDE typically includes toolboxes of components that can be used to develop code. However, the toolboxes that are provided with an IDE do not always include all of the components that a programmer wishes to use. Accordingly, some programmers have found it useful to develop customized components that can be used to enhance the IDE in which they are programming. ASP.NET, by Microsoft, Inc., for example allows third party developers to create new and interesting components that can be integrated into an IDE to program code.

If a programmer desires to utilize a component that does not currently exist within an IDE, the programmer can independently create or locate the desired component and install it. This, however, may not be very efficient. In particular, there is no convenient way to search for, compare, or share newly created components. Accordingly, the programmer may be unaware that the desired component already exists and may unknowingly recreate the desired Z>component, thereby 'reinventing the wheel'.

Even when the programmer knows that the desired component exists, it can still be difficult to track down and integrate the component into the IDE. In particular, even when the programmer knows exactly where the desired component resides, existing development environments do not enable the programmer to access the desired component directly from within the IDE. Rather, the programmer must utilize other applications to access the desired component for installation into the IDE.

BRIEF SUMMARY OF THE INVENTION

The present invention is generally related to methods and systems for enabling a programmer to access remotely located components from directly within an Integrated Development Environment (IDE).

According to one aspect of the invention, an interface interacts with a network communication protocol, such as, but not limited to, a web service that can identify components that are stored within one or more component repositories. The component repositories can be queried with the interface to identify one or more desired components for installation. The components may include various files that are formatted in a modified dynamic loadable library (DLL) format for facilitating authentication of the files.

According to one embodiment, the interface can also be used to extract and install the one or more desired components into the toolboxes of the IDE, thereby eliminating the need for separate applications to track down and install the components from the component repositories. The interface can also be used to access metadata, reviews and other information about the components before they are installed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for providing access to remotely located components from directly within an Integrated Development Environment (IDE).

According to one aspect of the invention, an interface that is configured for accessing one or more remote repository is launched from directly within an IDE. A programmer can use the interface to query the repository for one or more desired components and to obtain additional information about the components. Any desired components that are identified by the interface can also be installed with the interface directly into the component toolboxes of the IDE for immediate use.

The embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Figure 1:
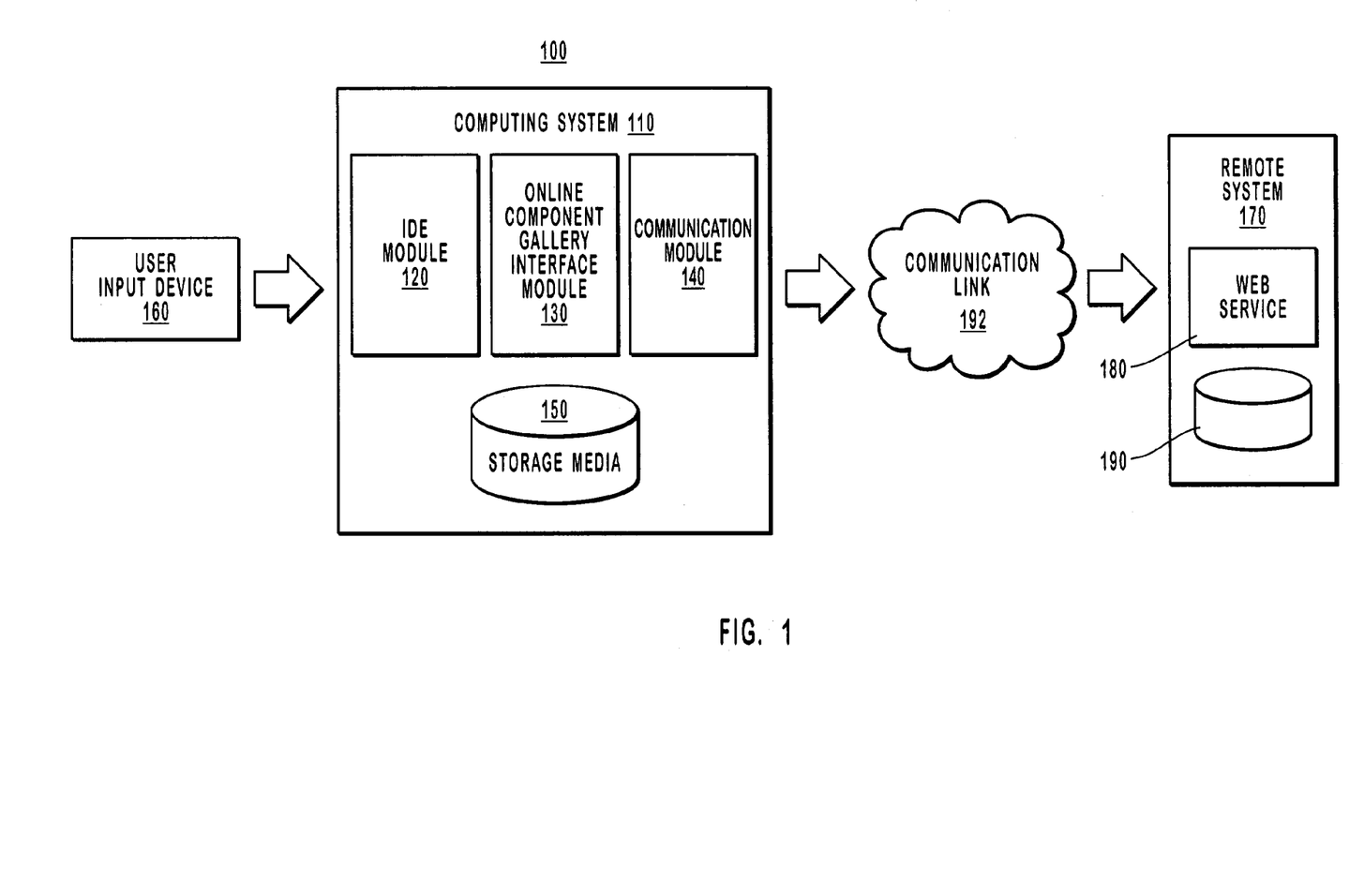
FIG. 1 illustrates a block diagram of one embodiment of a computing environment in which methods of the invention may be practiced.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

According to one embodiment, the methods of the invention may be practiced in the computing environment 100 shown in FIG. 1. The computing environment 100 includes a computing system 110 that incorporates various modules 120, 130, 140 and a storage media 150. The computing system 110 is configured to provide an IDE for developing programs and for receiving input from an appropriate user input device 160. The input device 160 may include a keyboard, mouse, touchpad, voice recognition system, other input devices, and combinations thereof.

The computing system 110 is also configured to communicate with a remote system 170 that includes a web service 180 and a component repository 190, which may comprise any combination of local and remote storage media (e.g., a hard drive, diskette, etc.). It will be appreciated that the remote system 170 can include any number of computing systems, servers, and networks. The component repository 190 can store component files and pointers to other storage media that may contain component files.

The web service 180 communicates with the computing system 110 to identify and provide access to the component files that are stored in the component repository 190 and other storage media. The web service 180 may provide various functionality for searching the one or more corresponding repositories 190. For example, the web service 180 may enable the repositories to be searched by category, by keyword or another method. The web service 180 may also allow a database query to be performed to provide information about the components stored in the repository 190. The web service 180 can also be configured to allow a user to submit new components into the repository and to provide additional information about the stored components (e.g., reviews). It will be appreciated, however, that these examples are merely illustrative and should not be construed as limiting the scope of the invention. For example, the web service 180 may actually comprise any network communication protocol.

Communication between the computing system and the remote system 170 can occur through any suitable communication link 192, including physical and wireless connections. The communication link 192 can also include direct connections as well as network connections, such as the Internet.

The modules 120, 130 and 140 of the computing system will now be described in more detail. The IDE module 120 includes computer-executable instructions for providing IDE graphical interfaces that include visual tools or components that can be used by a programmer to generate code. According to one embodiment, the IDE module 120 is configured to utilize the ASP.NET technology provided by Microsoft, Inc.

The Online component gallery interface module 130 includes sufficient computer-executable instructions for providing an interface that can be launched from directly within the IDE. The Online component gallery interface module 130 is also configured to enable the component gallery interface to query one or more component repositories such as, for example, through a web service, as above. Accordingly, the component gallery interface can also be configured to enable querying of the component repository by keyword, by category, or any other suitable method.

The Online component gallery interface module 130 also includes sufficient computer-executable instructions to extract components and other files from the component repositories. For example, the component gallery interface can extract files that are identified or stored in component repository 190 and other remote storage media.

According to one embodiment, the component files accessed by the component repositories are configured in a library file such as a DLL file or an MCL ("Media Center Link") file. An MCL file, as defined herein, is configured to contain various files and data, including metadata (author, file size, package contents, etc.), an icon file, a preview screenshot file, and lists of other files (including relative installations paths for installing the component files) as provided in the ASP.NET framework. The MCL file is not necessarily an executable, as is a DLL, but is configured similar to a DLL so as to enable the Authenticode® software from Microsoft, Inc. to be used to sign and verify the MCL files. The online component gallery interface module 130 extracts the necessary files from the repository MCL files to install the desired one or more components into the programmers IDE. Accordingly, the metadata, component icon, preview screenshot and other elements of the downloaded component are integrated directly into the IDE interfaces without requiring the use of any separate installation software applications.

Despite the foregoing disclosure, it will be appreciated that the invention is not limited to embodiments that include MCL file formats. Rather, the MCL file formats merely illustrate one example of a file format that can be used by component repositories for identifying and storing component files that can be extracted and installed into the programmer's IDE. It will also be appreciated that the act of installing component files into the programmer's IDE should be broadly construed to include embodiments in which the component files are downloaded and stored into local storage, such as the storage media 150 or a remote storage media that is accessible by the computing system 110. Preferably, the files are stored into the appropriate location for enabling their intended use.

The communication module 140 includes sufficient computer-executable instructions to enable communication between the computing system, the user input device 160 and the web service 180 of the remote system 170. The communication module 140 also includes computer-executable instructions for enabling communication between the modules 120, 130, 140 and the storage media 150 of the computing system 110.

Accessing Remotely Located Components

Figure 2:
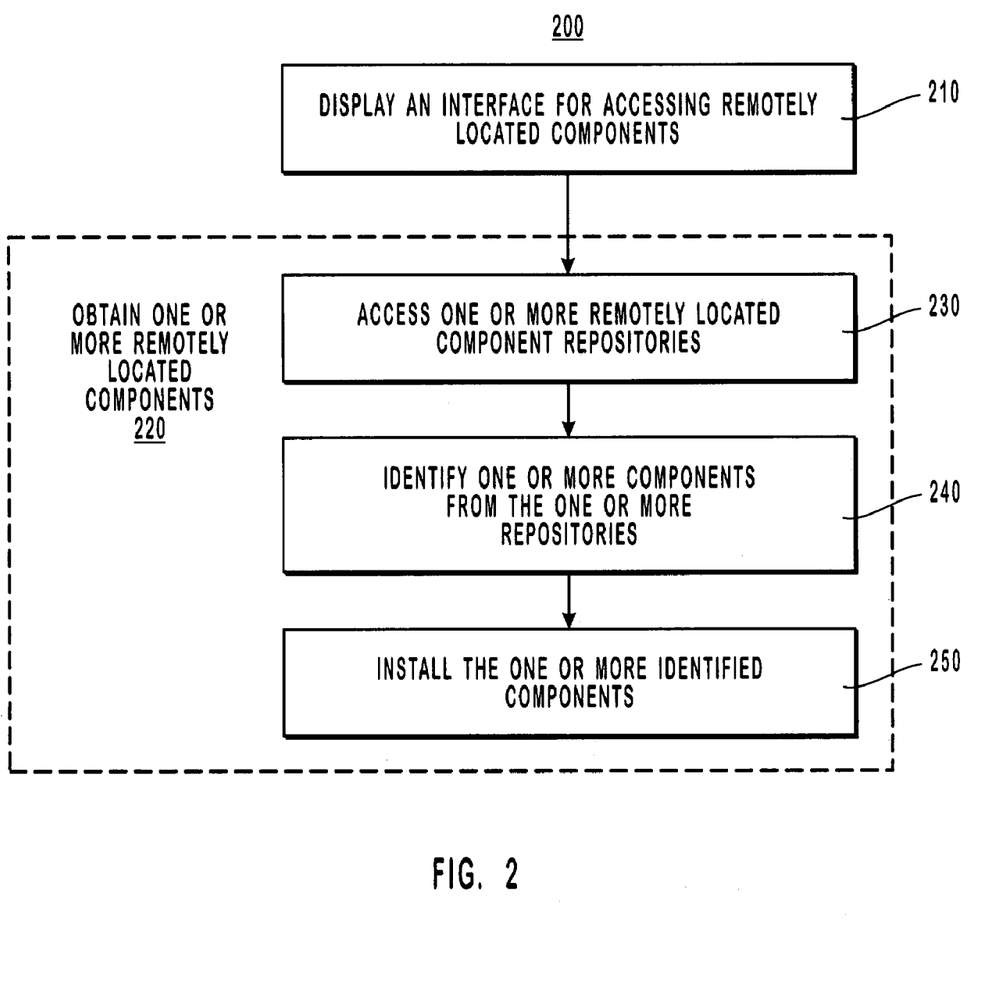
FIG. 2 illustrates a flowchart of one embodiment of a method for accessing remote components from within an integrated development environment.

FIG. 2 includes a flowchart of one method for accessing remote components from within an IDE. As shown, the method includes an act of displaying an interface that can be used for accessing remotely located components (act 210), a step for obtaining the one or more remotely located components (step 220), and the corresponding acts of accessing one or more remotely located component repositories (act 230), identifying one or more components from the component repositories (act 240), and installing the one or more identified components (act 250). The foregoing acts and step will now be described in more detail with specific reference to FIGS. 3 and 4.

Figure 3:
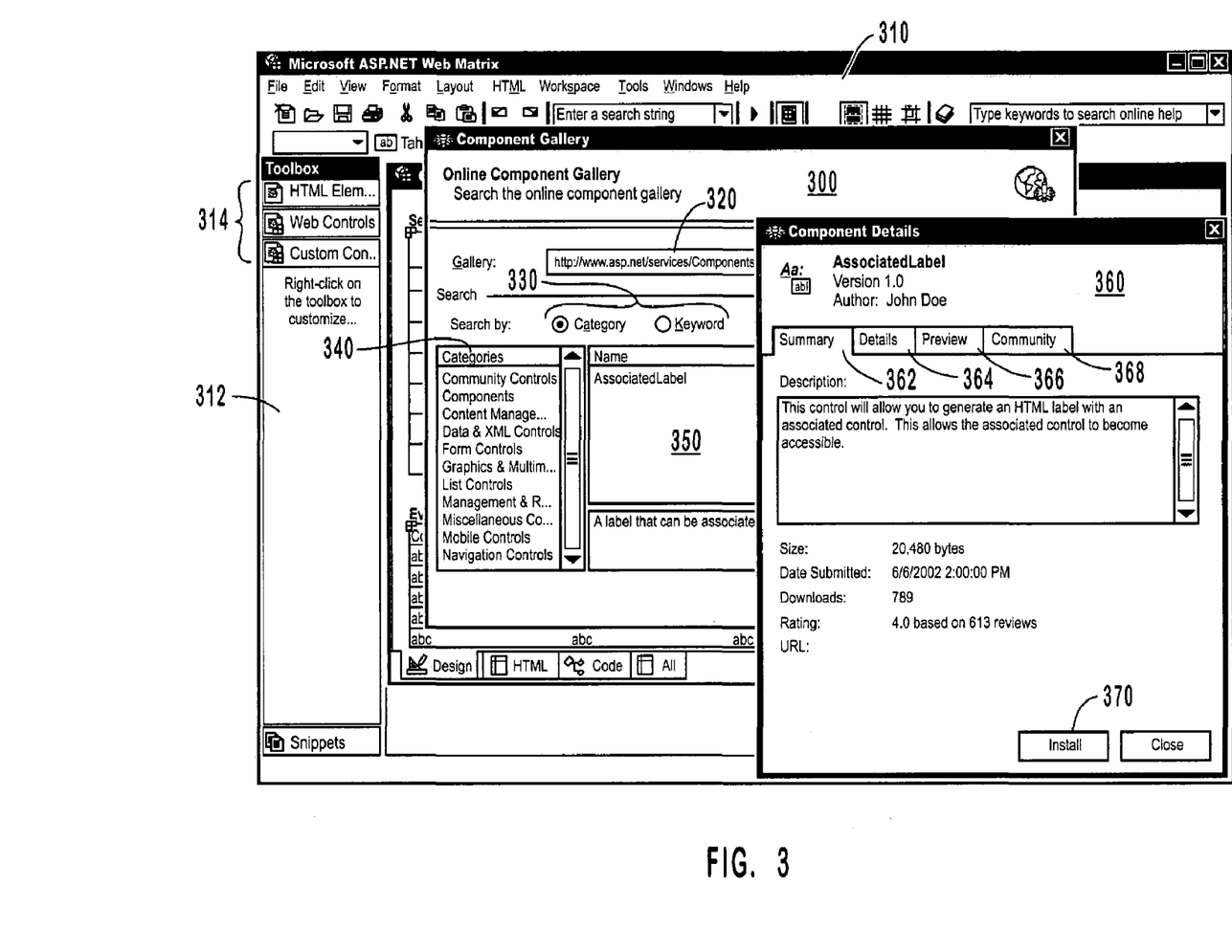
FIG. 3 illustrates one embodiment of an interface that is launched from within an integrated development environment to access remotely located components from an Online component gallery.

FIG. 3 illustrates one embodiment of an interface that can be displayed for accessing remotely located components (act 210). In particular, the component gallery interface 300 is displayed with features that enable it to access remotely located components from remotely located component repositories, as will be described below.

The component gallery interface 300 is presently displayed in an overlying position on top of the IDE graphical interface 310. In this embodiment, the IDE graphical interface 310 comprises a Microsoft ASP.NET Web Matrix interface. The IDE interface 310 includes a toolbox pane 312 containing toolboxes 314 that can be explored to reveal various components that can be used by a programmer to develop code. These components can include, for example, tools for performing RAD (Rapid Application Development) and other program developing techniques. Non-limiting examples of components that may be utilized by the IDE interface 310 include, but are not limited to, IDE extensions, controls, plugins, and other similar tools.

The component gallery interface 300 can be launched from directly within the IDE by any appropriate means. By way of example, a pull down menu option, a control button, or other display object can be displayed and selected from the IDE interface 310 to launch the component gallery interface 300. In one embodiment, a right-click of a mouse prompt within the toolbox pane 312 causes the IDE interface to display an option for obtaining new components. When that option is selected, the IDE interface launches the component gallery interface 300.

As shown in FIG. 3, the component gallery interface 300 includes various fields and objects for accessing remotely located components. The component repository search object 320, for example, is provided so that a particular repository can be designated or selected for querying. The component repository search object 320, may include a type-in line, as shown, a pull-down menu, repository icon links, or any combination thereof.

In the present embodiment, a URL (http://www.asp.net/services/Components) has been supplied to the type-in line of the component repository search object 320, thereby indicating the address of the Online component gallery to be searched. According to one embodiment, the Online component gallery includes the web service that is used to access a desired one or more corresponding component repositories, as well as the repositories that are hosted or accessed by the web service.

The component gallery interface 300 then connects to the designated Online component gallery repository or corresponding web service when directed, such as, for example, when a connect button (not shown) or other object is selected by a user. Means for connecting to and communicating with the web service and corresponding repository include any direct and network connections, including physical and wireless connections, as described below in reference to FIG. 5.

The component gallery interface 300 also includes search options 330 (e.g., by category, by keyword, or any other desired method) that can be used to designate the preferred method for searching the repository. In the present embodiment, the search options 330 indicate that the preferred method for searching is by category. Accordingly, the web service corresponding to the repository will provide the component gallery interface a list 340 of available component categories obtained from the corresponding component repository. When a category is selected, a list 350 of the available components corresponding to the selected category is then displayed.

Figure 4:
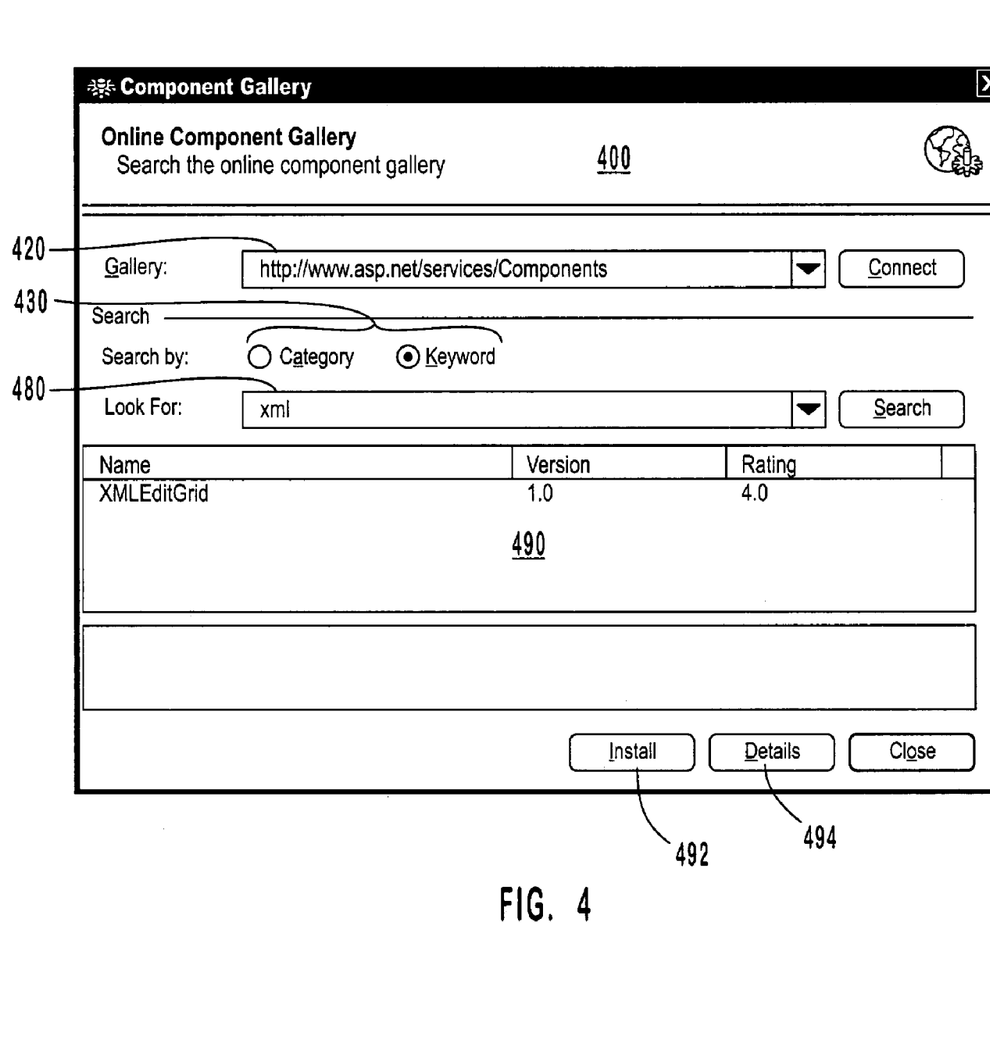
FIG. 4 illustrates one embodiment of an interface that can be used to query a component gallery for components by keyword.

FIG. 4 illustrates another embodiment of the component gallery interface 400, in which the search options 430 indicate that the preferred method for searching the repository is by keyword. Accordingly, a search object 480 is provided to indicate what keyword should be searched for. The search object 480 can include type-in lines, pull-down menus, and other objects that are configured to enable a selection of a keyword to be searched. In the present embodiment, the search object 480 includes a type-in line that is populated with the text "xml". The repository is then searched, via the corresponding web service, to identify any components that are related to the designated keyword "xml." In the present embodiment, only a single component is identified. It will be appreciated, however, that in other embodiments, numerous components may be identified.

Once a component has been identified (act 240), as described above, the component gallery interface 300 can be used to access additional details and information about the one or more components to determine whether the identified component(s) is desired. For example, the component gallery interface 300 can provide a brief summary about a selected component within a windowpane of the component gallery interface 300. Additional details can also be provided in separate windows, as illustrated in FIG. 3. A separate detail window 360 can be launched, for example, when a details button 494 (FIG. 4) or another appropriate object is selected.

The details window 360 can be configured to contain any type and quantity of information about the one or more selected components. In one embodiment, the details window 360 includes a summary option 362, a details option 364, a preview option, and a community option 368. One embodiment of the detail window 360, while in the summary mode, is illustrated. As shown, the summary mode of the detail window 360 includes a brief description of the selected component, as well as the size, submission date, user rating and the number of times the component has been downloaded from the repository. It will be appreciated, however, that this example is merely illustrative and should not, therefore, be construed as limiting the scope of the invention.

The details mode, which is not shown, may include the component name, the author's name, the version of the component, the size of the component, and so forth. The community view, which is not shown, may include community information, such as, but not limited to, user reviews, number of downloads, and average user rating. The preview mode, which is also not shown, may provide a listing of citations containing reviews of the component.

A desired component can be installed (act 250) by downloading the component from the repository or other storage media where the component is stored. The location of the component is identified by the web service and communicated to the component gallery interface. In certain embodiments, the one or more desired components are installed by extracting the appropriate component files from a parent MCL file that is stored in the repository. In other embodiments, the component files are downloaded from remote locations identified by the web service. Non-limiting examples of component files that can be extracted and downloaded, include metadata files, icon files, preview screenshot files, and other files that may be utilized by the IDE graphical interfaces to develop code and to provide information to the programmer.

According to one embodiment, the component files are automatically extracted and installed into the IDE toolboxes or other locations of the IDE interface when the install button 370, 492 is selected or when other input is received that indicates the component should be installed.

It will be appreciated, however, that the step (step 220) for obtaining one or more remotely located components, as described above, does not necessarily consist of only acts 230, 240 and 250, which have been described above. Rather, step 220 may also include other combination of the recited acts 230, 240, and 250, as well as any other corresponding acts that are considered appropriate to obtain one or more remotely located components (step 220).

By way of example, step 220 may also include an act of authenticating the component files with software, such as the Authenticode® software provided by Microsoft, Inc. To facilitate authentication with the Authenticode® software, it may be desirable to format the component files into MCL files of other DLL file variations, as described above. Nevertheless, it will be appreciated that the invention is not limited to the use of MCL file formats.

In summary, the present invention generally provides access, from within an IDE, to components that are remotely located from the IDE. According to one embodiment, a component gallery interface is provided for interacting with a web service to query one or more corresponding component repositories. Once a desired component is identified, it can be downloaded and installed into the IDE for immediate use. It will be appreciated that these and other benefits provided by the present invention provide advantages over the prior art systems and methods for obtaining remotely located components.

Operating Environment

Those skilled in the art will also appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 5:
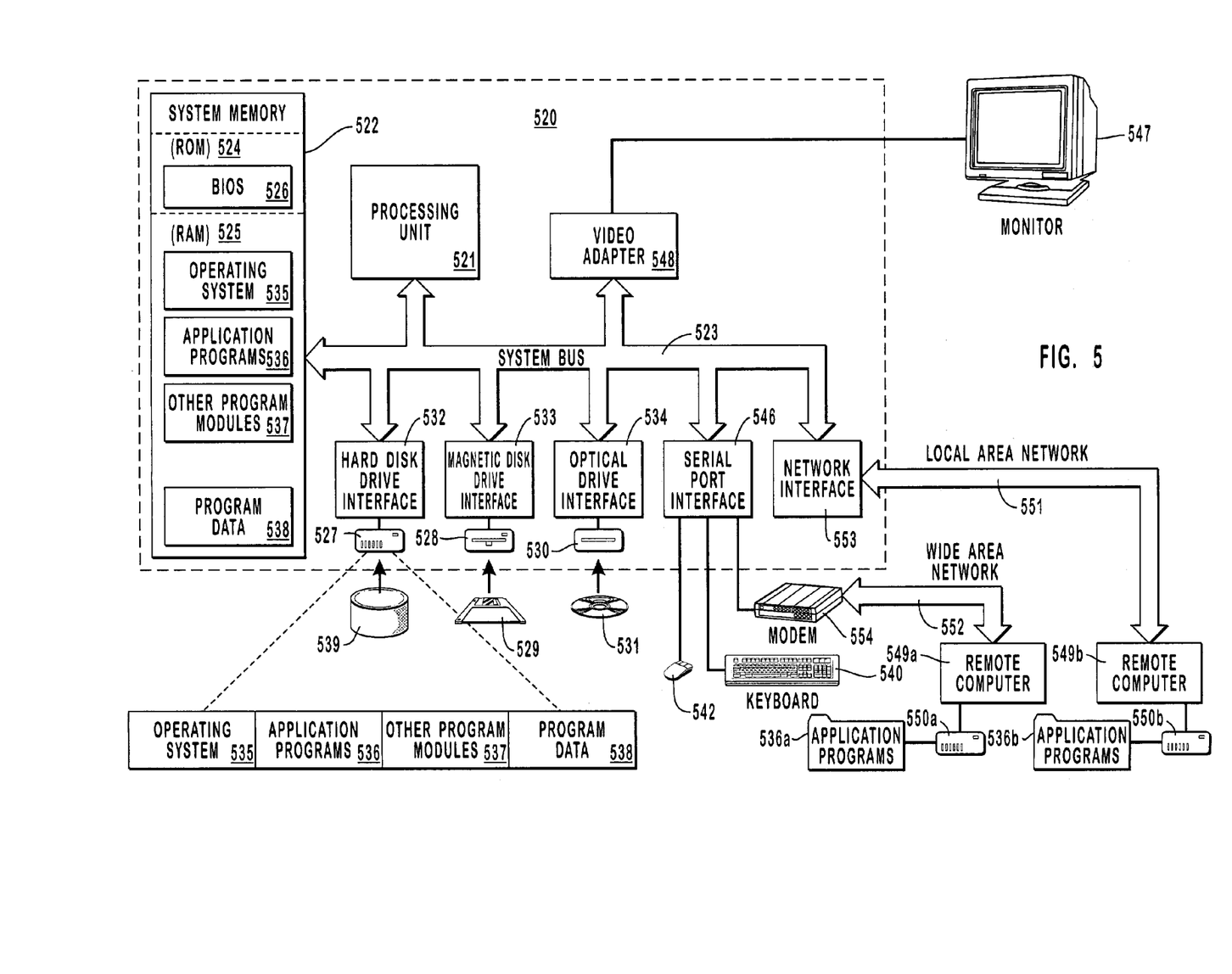
FIG. 5 illustrates one embodiment of a computing environment in which methods of the invention may be practiced.

FIG. 5 and the following discussion are intended to provide a brief, general description of a suitable computing environment for implementing certain elements of the invention. However, it should be emphasized that the present invention is not necessarily limited to any particular computerized system and may be practiced in a wide range of computerized systems.

According to one embodiment, the present invention includes one or more computer readable media storing computer-executable instructions, such as program modules, that can be executed by computing devices. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments, in addition to individual computing device, with many types of computer system configurations, including personal computers, hand-held devices, multi-processor systems, microprocessor-based or programmable consumer electronics, network PCs, minicomputers, mainframe computers, components thereof, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With specific reference to FIG. 5, an exemplary system for implementing certain elements of the invention includes a general purpose computing system in the form of a conventional computer 520, including a processing unit 521, a system memory 522 comprising computer readable media, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. These storage media can also be used to store data structures associating correction coefficients with gamma values, as described above. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like., Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In this context, the video adapter 548 is considered to include a GPU as described above. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 20 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that includes an integrated development environment (IDE) configured for developing computing programs, the integrated development environment including one or more components that can be used for developing the computing programs, a method for providing access, from within the integrated development environment, to one or more components that are located remotely from the integrated development environment, the method comprising:

providing an interface for accessing one or more remotely located component repositories,
wherein the interface is configured to be launched from within the integrated development environment,
wherein the interface includes options that can be used to designate the preferred method for searching a repository,
wherein the interface includes a component gallery search object such that a particular repository may be designated for querying, and
wherein the component gallery search object comprises a type-in line, a pull-down menu, and repository icon links;
an act of accessing, with the interface, the one or more remotely located component repositories;
an act of querying, with the interface, the one or more remotely located repositories, wherein said querying comprises receiving user input through the interface, obtaining additional information about one or more components, and wherein additional information includes each of metadata, reviews, and author name of the one or more components;
an act of selectively identifying one or more desired components, the identified components matching the user input received through the interface during querying;
an act of selecting, with the interface, from the one or more components having been identified by querying, one or more components for installation into the integrated development environment; and
an act of downloading and installing the one or more components identified and selected for installation.

2. A method as recited in claim 1, wherein providing the interface includes launching and displaying the interface from within the integrated development environment.

3. A method as recited in claim 1, wherein the act of querying the one or more remotely located repositories occurs through a network communication protocol that has access to the one or more remotely located repositories.

4. A method as recited in claim 1, wherein querying the one or more remotely located repositories is performed by keyword.

5. A method as recited in claim 1, wherein querying the one or more remotely located repositories is performed by category.

6. A method as recited in claim 1, wherein the one or more components includes at least one of an IDE extension, a control, and a plugin.

7. A method as recited in claim 1, wherein the one or more components includes component files that are packaged in a modified dynamic loadable library (DLL) format.

8. A method as recited in claim 7, wherein the modified DLL format is a Media Center Link (MCL) format.

9. A method as recited in claim 1, further including an act of authenticating the one or more components.

10. A method as recited in claim 1, wherein the act of installing the one or more components includes an act of installing the one or more components into an existing toolbox in the IDE.

11. A computer program product for use in a computing system that includes an integrated development environment (IDE) configured for developing computing programs, the integrated development environment including one or more components that can be used for developing the computing programs, the computer program product comprising a computer-readable storage medium having recorded thereon computer-executable instructions for implementing the method of claim 1.

12. A computer program product as recited in claim 11, wherein providing the interface includes displaying the interface from within the integrated development environment.

13. A computer program product as recited in claim 11, wherein the act of identifying one or more components desired for installation includes an act of obtaining additional information about the one or more components.

14. A computer program product as recited in claim 13, wherein the additional information includes one or more of metadata, reviews, and author name of the one or more components.

15. A computer program product as recited in claim 11, wherein the act of querying the one or more remotely located repositories occurs through a web service that has access to the one or more remotely located repositories.

16. A computer program product as recited in claim 11, wherein querying the one or more remotely located repositories is includes at least one of a keyword search and a category search.

17. A computer program product as recited in claim 11, wherein the one or more components includes at least one of an IDE extension, a control, and a plugin.

18. A computer program product as recited in claim 11, wherein the one or more components includes component files that are formatted in a modified DLL format.

19. A computer program product as recited in claim 18, wherein the modified DLL format is an MCL format.

20. A computer program product as recited in claim 11, wherein the method further includes an act of authenticating the one or more components.

21. A computer program product as recited in claim 11, wherein the act of installing the one or more components includes an act of installing the one or more components into an existing toolbox in the IDE.

* * * * *